US008523195B2

(12) United States Patent
Lin (10) Patent No.: US 8,523,195 B2
(45) Date of Patent: Sep. 3, 2013

(54) SNOW SLED

(75) Inventor: Joseph Lin, Torrance, CA (US)

(73) Assignee: Stallion Sport Limited, Hong Kong (HK)

( * ) Notice: Subject to any disclaimer, the term of this patent is extended or adjusted under 35 U.S.C. 154(b) by 255 days.

(21) Appl. No.: 12/930,943

(22) Filed: Jan. 19, 2011

(65) Prior Publication Data

US 2012/0181759 A1 Jul. 19, 2012

(51) Int. Cl.
  *B62B 13/00* (2006.01)
  *B62B 13/08* (2006.01)
  *B62B 17/08* (2006.01)

(52) U.S. Cl.
  CPC ............... *B62B 13/08* (2013.01); *B62B 17/08* (2013.01)
  USPC ............... 280/16; 280/21.1; 280/18

(58) Field of Classification Search
  CPC ...... B62B 13/08; B62B 13/16; B62B 17/068; B62B 17/08
  USPC ..................... 280/16, 21.1, 18, 28
  See application file for complete search history.

(56) References Cited

U.S. PATENT DOCUMENTS

| 2,109,826 | A | * | 3/1938 | McCleary | 280/16 |
| 2,129,935 | A | * | 9/1938 | Johnson | 188/8 |
| 7,278,642 | B2 | | 10/2007 | Luhr et al. | |
| 7,552,930 | B2 | * | 6/2009 | Fitzgerald | 280/16 |
| 7,559,558 | B2 | * | 7/2009 | Luhr et al. | 280/16 |

* cited by examiner

*Primary Examiner* — John R Olszewski
*Assistant Examiner* — Brian Cassidy
(74) *Attorney, Agent, or Firm* — Raymond Sun

(57) ABSTRACT

A snow sled has a seating portion having a lower portion that is configured to slide on snow. The sled also includes a steering portion formed separately from the seating portion and having a ski support, a single front ski, and an arm having opposing ends that are pivotably coupled to the ski support and the front ski. The sled further includes a steering mechanism pivotably coupling the seating portion and the ski support of the steering portion. The pivotable couplings between the arm and the ski support and the front ski, together with the pivotable couplings between the steering mechanism and the seating portion and the ski support, are configured to allow for the front ski to be folded and stored under the seating portion. A braking member can also be provided at each end of the opposing ends of the ski support.

13 Claims, 6 Drawing Sheets

SNOW SLED

BACKGROUND OF THE INVENTION

1. Field of the Invention

The present invention relates to a snow sled having enhanced steering, performance, and safety.

2. Description of the Prior Art

Snow sleds have been used for many years for recreational purposes. Most current snow sleds have numerous limitations that generally make them suitable only for kids, or very limited use. These sleds are typically inexpensive but are generally uncontrollable, slow and/or heavy, which can also make them inherently dangerous. Additionally, current sleds are usually large, bulky and uncomfortable and can only be adequately used under certain types of snow conditions, such as packed powder. The large and bulky sizes of these sleds also make storage and transportation more inconvenient. These limitations have not been adequately addressed in the snow sled market.

SUMMARY OF THE INVENTION

It is an object of the present invention to provide a snow sled that is convenient and safe for use by adults and children alike.

It is another object of the present invention to provide a snow sled that can be conveniently stored and transported.

It is yet another object of the present invention to provide a simple yet effective braking mechanism for a snow sled.

The present invention provides a snow sled that is used on snow. The sled has a seating portion having a lower portion that is configured to slide on snow, and an upper portion that has a membrane for supporting a person, the seating portion including a frame that defines the upper and lower portions. The sled also includes a steering portion formed separately from the seating portion and having a ski support, a single front ski, and an arm having opposing ends that are pivotably coupled to the ski support and the front ski. The sled further includes a steering mechanism pivotably coupling the seating portion and the ski support of the steering portion. The pivotable couplings between the arm and the ski support and the front ski, together with the pivotable couplings between the steering mechanism and the seating portion and the ski support, are configured to allow for the front ski to be folded and stored under the seating portion. A braking member can also be provided at each end of the opposing ends of the ski support.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1-5B illustrate a snow sled 10 according to one embodiment of the present invention. The sled 10 includes a seating portion 18 and a steering portion 20 linked together by a steering mechanism 16. The sled 10 can be modular in that most of its components can be easily removed for replacement without special tools.

Figure 1:
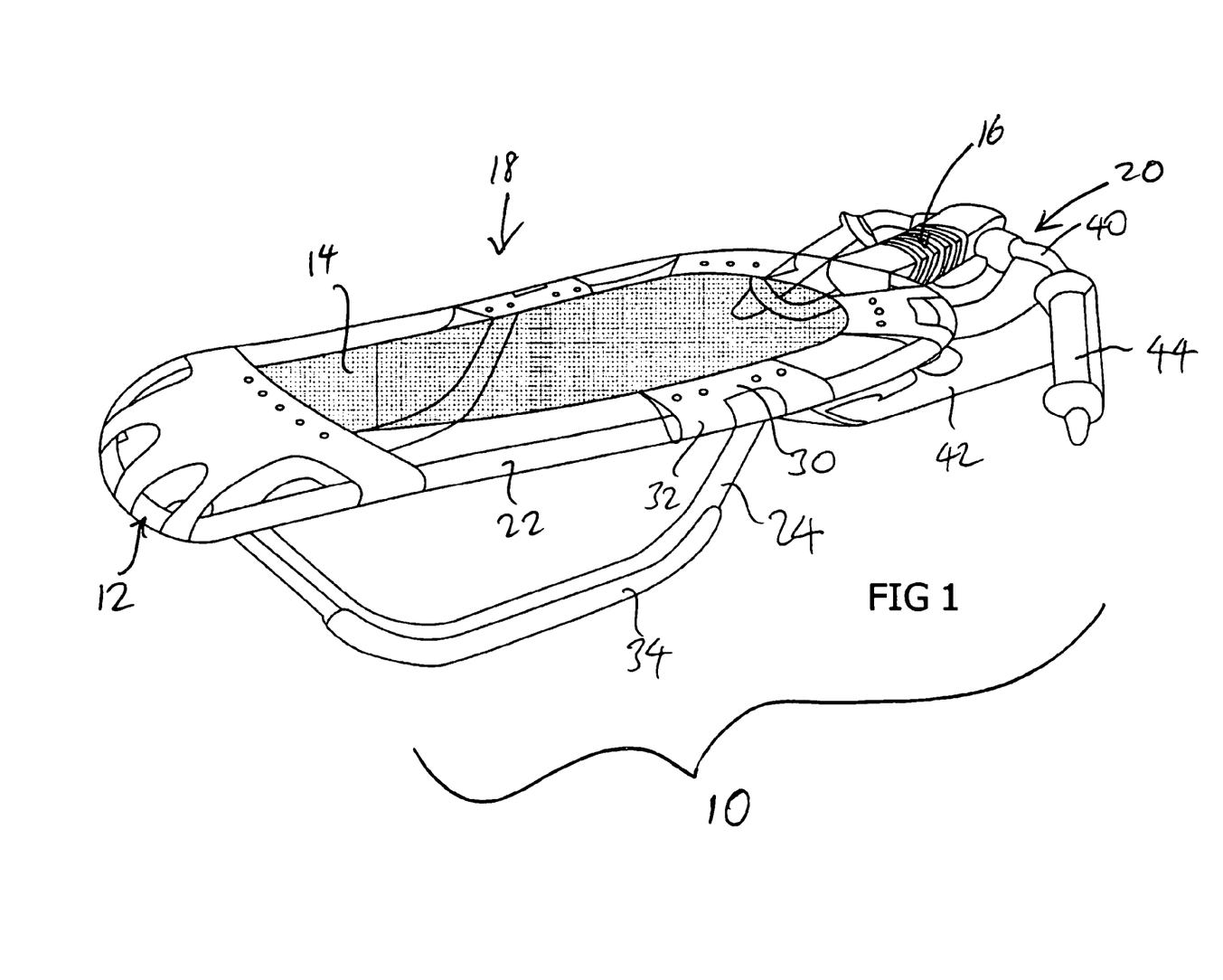
FIG. 1 is a perspective view of a snow sled according to one embodiment of the present invention.
Figure 2:
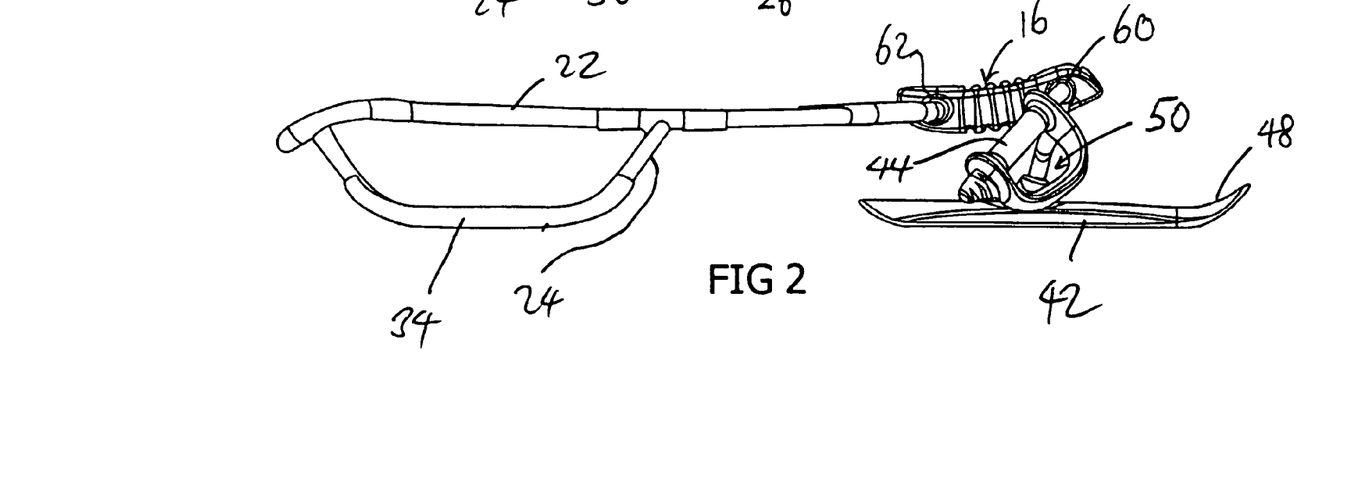
FIG. 2 is a side plan view of the snow sled of FIG. 1.
Figure 3:
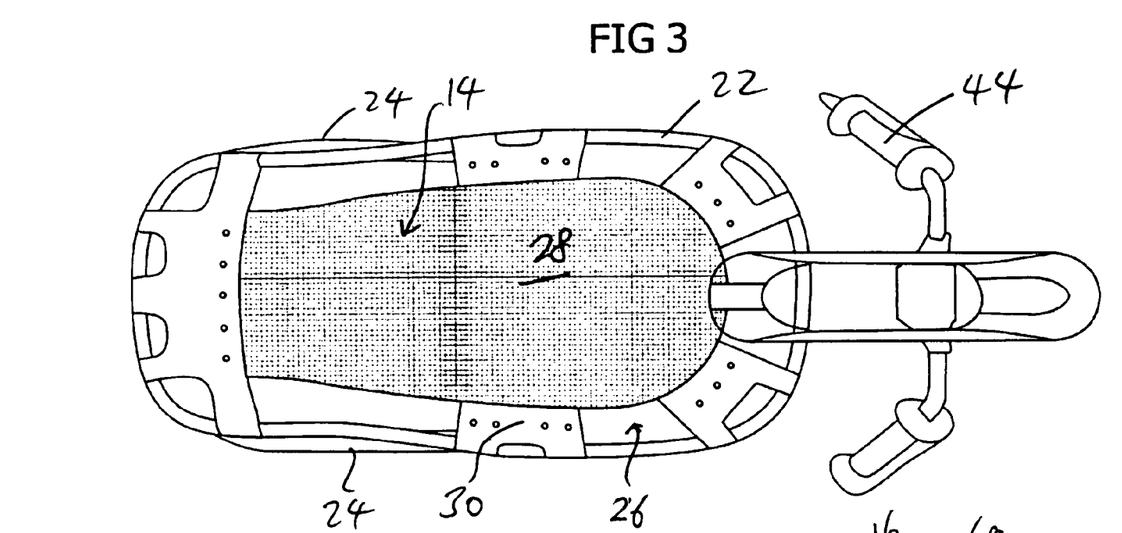
FIG. 3 is a top plan view of the snow sled of FIG. 1.

The seating portion 18 may include a space frame 12 that permits the sled 10 to be relatively lightweight yet provide significant strength and rigidity. The frame 12 can be made of one or more elongate members, such as members 22 and 24. Members 22, 24 may be made of a lightweight material, such as aluminum, titanium or a carbon fiber composite, among others. In addition, members 22, 24 preferably, but not necessarily, have a tubular configuration. The member 22 can function as the supporting frame that defines an opening 26 for a suspension-type seat 14, while the members 24 can function as side legs. The members 24 can be connected to the member 22 by any suitable type of connection, such as a welded connection, bonded connection or mechanically-fastened connection, among others. The members 22, 24 may have any desired cross-sectional shape, such as circular, rectangular or oval, among others. Although only two members 22 and one member 24 are shown in FIGS. 1-3, those skilled in the art will appreciate that, depending upon the configuration of each member and the overall configuration of frame 12, more or fewer members may be used. The members 22, 24 may also be of applicable size to accept accessories (not shown) normally used for bicycles, such as lights, horns, bells, mirrors and water bottles, among others.

The suspension-type seat 14 not only contributes to a lightweight design, but also enhances the comfort of the rider during use. The seat 14 may comprise a membrane 28 stretched among various portions of the frame 12, e.g., among portions of the frame member 22. The membrane 28 may be made of a lightweight fabric, film or combination of the two, among other things. In one embodiment, the membrane 28 may comprise thermoplastic fibers, or reinforcing filaments, woven with filler material. Membrane 28 may include a seating surface (on the upper surface of the membrane 28) where a user sits or lies while using the sled 10. It is noted that the seat 14 need not be of a suspension-type in other embodiments. Rather, the seat 14 may comprise one or more other members (not shown) that work primarily in bending and/or compression, rather than primarily in tension as occurs in the membrane 28. If the seat 14 is a suspension-type seat, the membrane 28 may be stretched, or preloaded, so as to provide the desired suspension characteristics. The seat 14 may be similar in construction to the construction used to make certain types of chairs, bicycle seats and automobile seats. This type of construction is disclosed generally in, e.g., U.S. Pat. Nos. 6,035,901, 6,386,634 and 6,540,950, which are incorporated herein by reference.

Depending upon the design of the seat 14, the membrane 28 may be attached to one or more support attachments 30 that either attach directly to the frame 12 as shown, or are configured to engage one or more connecting members (not shown) that connect each support attachment 30 to the frame 12. In the embodiment shown, each support attachment 30 can be made of a semirigid thermoplastic material sewn to the membrane 28. In alternative embodiments, each support attachment 30 may be more or less rigid, made of a different material, made of an elastomeric material, and/or secured to the membrane 28 by other means. For example, each support attachment 30 may be secured to the membrane 28 by adhesive bonding or mechanically using a channel and spline-type connection. Each support attachment 30 may include a loop portion 32 looped around a portion of the member 22 and folded back onto, and attached to, itself, such as by mechanical interlock (e.g., with studs and grommets, rivets, melt-bonding, adhesive bonding or other similar means).

The lower portion of the seating portion 18 has one or more skis 34 designed for sliding on snow. Each ski 34 may be configured to be readily detachable from the member 24 for the ease of replacement with new skis or alternative skis designed, e.g., for use in a different snow condition. Each ski 34 is configured for quick mounting on corresponding respective portions of the member 24 using, for example, a plurality of interference-type clips (not shown) and an overbite (not shown) created by the ski conformally engaging the cylindrical shape of the member 24 by more than half of the circumference of the cylindrical shape. Other types of quick connect mechanisms may also, or alternatively, be used. In addition, the skis 34 may be fixedly attached to the member 24 or provided integral with the frame 12. One example of the skis 34 is illustrated in U.S. Pat. No. 7,278,642, whose disclosure is incorporated by reference.

The steering portion 20 has a ski support 40 and a single ski 42 operatively attached to the ski support 40. The ski support 40 may be configured, and/or made of one or more materials, to match the frame 12, if desired. For example, the ski support 40 can also be made of tubular metal members. Control grips 44 can be provided where a user may rest his/her feet or grip with his/her hands during use and may apply the necessary forces for steering the sled 10 during use. The grips 44 may be made of a suitable material (e.g., rubber or plastic), and may define openings 50 or other structures for allowing the user to grip or otherwise control the grips 44. Braking members 45 can be provided at the outermost ends of the grips 44. Each braking member 45 can be made of a material that is effective in creating friction, such as the same material used for the grips 44.

Figure 6:
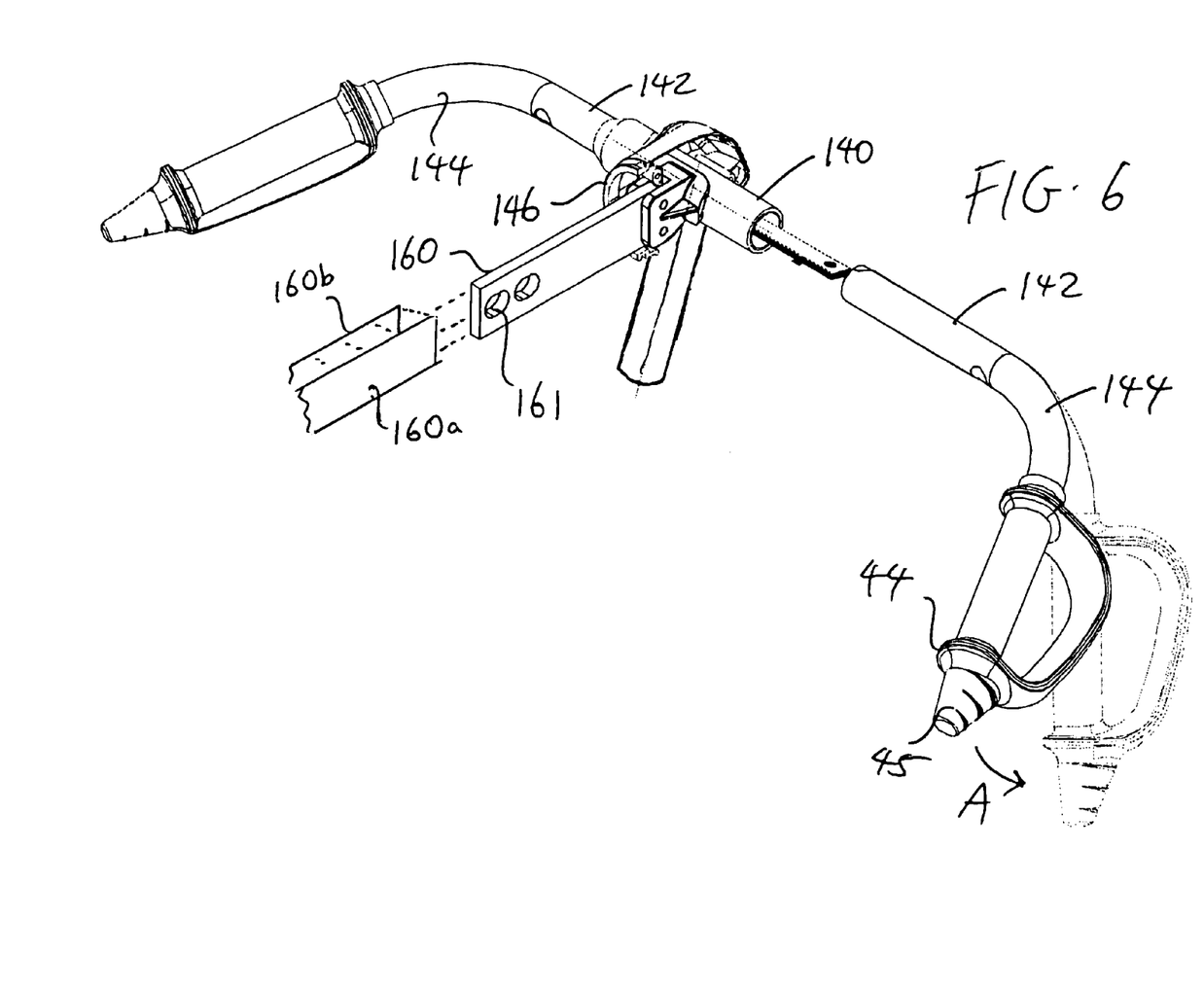
FIG. 6 is an exploded perspective view of the ski support and the steering mechanism.
Figure 7:
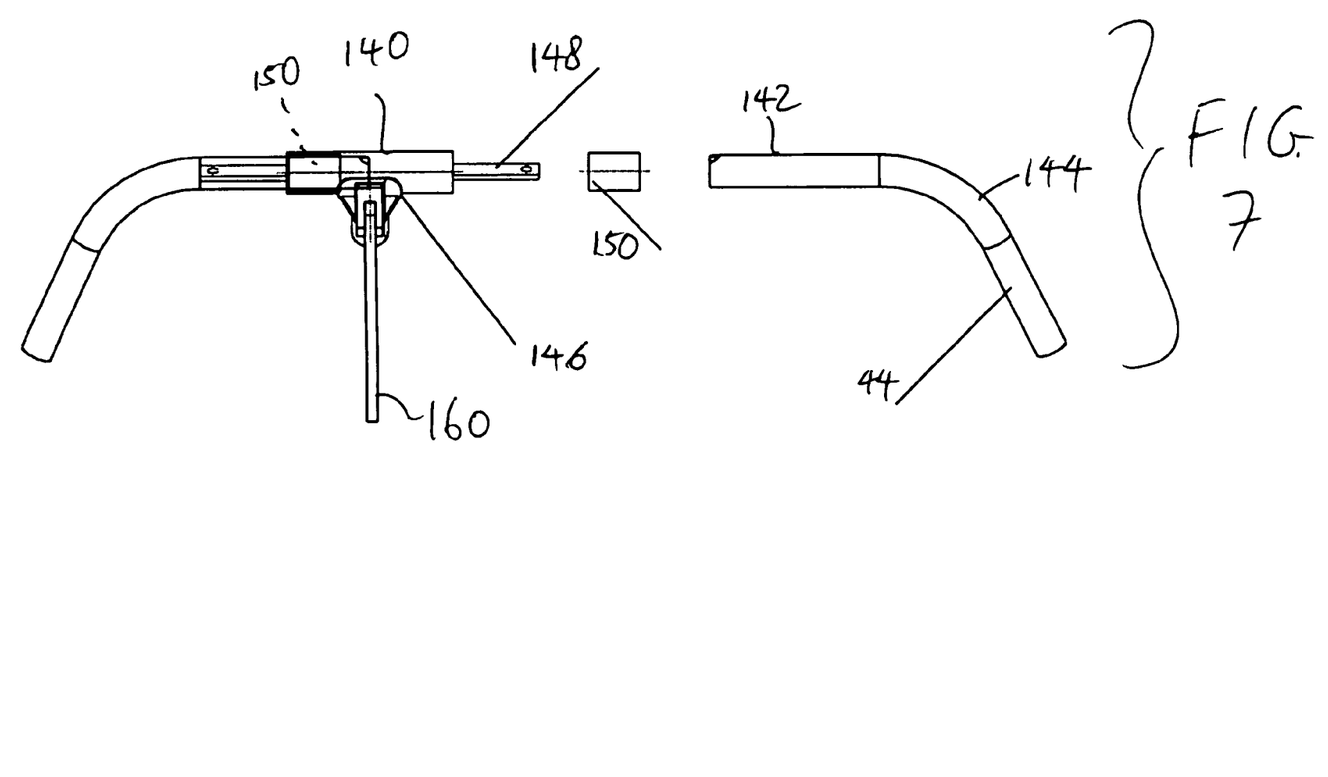
FIG. 7 is an exploded top plan view of the ski support and the steering mechanism.

Referring to FIGS. 6 and 7, the ski support 40 can be comprised of tubular bars 140, 142 and 144, a base member 146, an elongated internal spring steel sheet 148, and a nylon sleeve 150. A horizontal bar 142 and a handle bar 144 extend from either end of a central bar 140, and the spring steel sheet 148 extends inside the hollow interior of the bars 140, 142, 144. A control grip 44 is provided at each handle bar 144. A nylon sleeve 150 is provided between the central bar 140 and the other bars 142, 144 to reduce the resistance. In this regard, there will be resistance between the inside of the steel tube that make up the central bar 140 and the outside of the steel tube that makes up the horizontal bar 142. The nylon sleeve 150 is about 2 mm thick and is plastic in texture, which can reduce such resistance/friction between the steel tubes. The spring steel sheet 148 is rigid enough to support the bars 140, 142, 144, yet can be flexed to allow the control grips 44 (and the bars 140, 142, 144 associated therewith) to be twisted downwardly, as shown by the arrow A in FIG. 6, and to return to its original position. To provide sufficiently flexibility with the requisite rigidity, the spring steel sheet 148 can be provided in the form of a plurality (e.g., six to eight) of thin steel sheets, each having a thickness of about 0.5-1.5 mm. Here, the significance of using multiple sheets instead of a single (thicker) sheet is that thin sheets are much easier to bend.

The ski 42 may have a concave snow-engaging surface 46 (see FIG. 4A) extending substantially along the entire length and width of the ski 42. The ski 42 may further include one or more strakes (not shown) extending along the snow engaging surface 46 to enhance the lateral grip of the ski 42 during steering conditions. The ski 42 can also include patterned textures (not shown) on its snow engaging surface 46 to decrease sliding resistance and/or increase the maneuverability and controllability of sled 10. The ski 42 may include an upwardly-turned leading end 48 and an upwardly-turned trailing end (not shown) for enhancing the performance of the ski 42 in various snow conditions. Like the rear skis 34, the front ski 42 may be made of any suitable material, such as plastic, wood, metal or fiber reinforced composite, among others. High-density polyethylene or ultra-high molecular weight polyethylene may be particularly desirable. In addition, the ski 42 may be configured so as to be readily replaceable with new skis and/or skis (not shown) designed for a different snow condition.

Figure 4A:
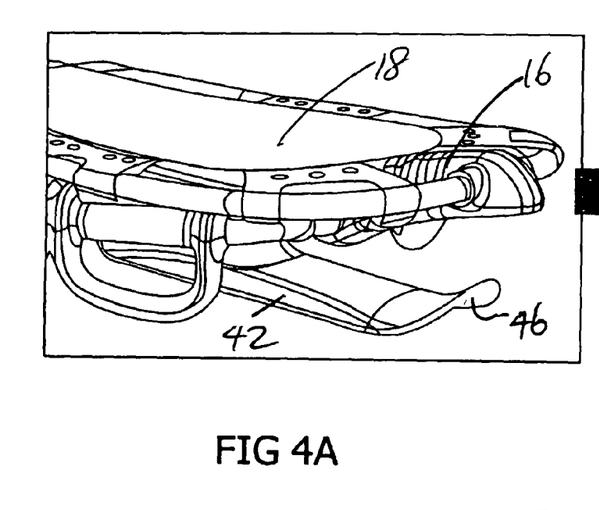
FIGS. 4A-4C illustrate how the steering portion is folded for compact storage.
Figure 4B:
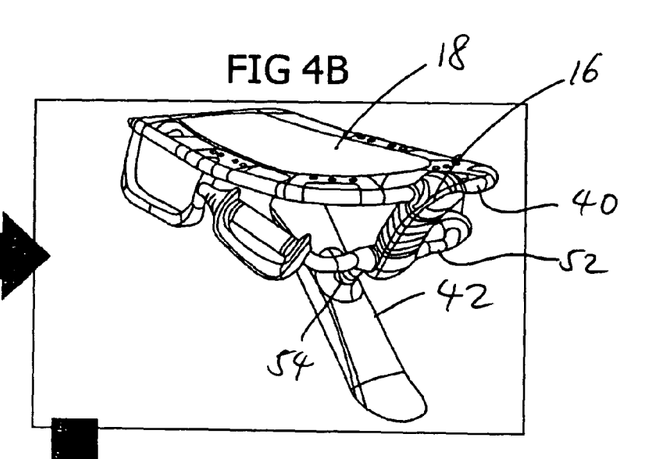
Figure 4C:
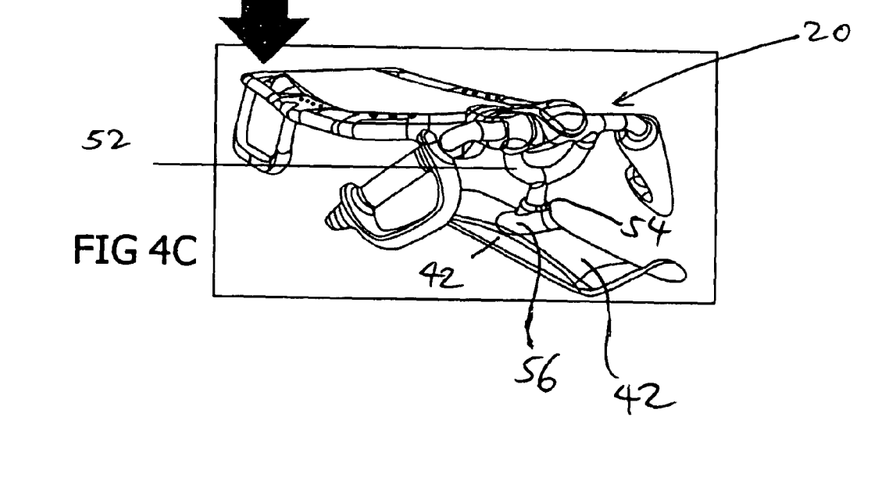

Referring to FIG. 4C, a Y-shaped arm 52 has its two upper ends connected to the ski support 40, and has its lower end connected to a pivot joint 54 that is provided on the ski 42. Thus, the ski 42 is pivotably attached via the pivot joint 54 to the lowest end of the arm 52 to so that the ski 42 may pivot in a substantially vertical plane within a limited range of motion relative to the ski support 40. The pivot joint 54 may be covered with a suitable protective boot 56 that keeps snow and/or ice from interfering with the pivoting action of the ski 42. The protective boot 56 may also dampen movement of the ski 42 relative to the ski support 40 and reduce chatter of the ski 42 against snow. The dampening and reduction of chatter are due, in part, by the resilient stiffness of the boot 56. The boot 56 may be made of any suitable material, such as rubber, plastic, metal mesh or other flexible material. The opposite ends of the ski support 40 may include an end cap (not shown) to dissipate and evenly distribute pressure on pivot joint 56.

The steering mechanism 16 generally couples the steering portion 20 to the seating portion 18 and allows the steering portion 20 to be pivoted laterally relative to the seating portion 18 so as to make the sled 10 readily steerable. In addition, the opposite ends 60 and 62 of the steering mechanism 16 should be pivotably coupled to the ski support 40 and the frame 12, respectively. In other words, the ski support 40 is pivotable about the steering mechanism 16 at the location 60, and the frame 12 is pivotable about the steering mechanism 16 at the location 62. More specifically, referring again to FIGS. 6 and 7, the steering mechanism 16 has an elongated spring steel sheet 160 having one end pivotally secured to the base member 146, and an opposite end (not shown) pivotally secured to the frame 12. The spring steel sheet 160 is housed in a flexible covering 162 which can be made of a flexible plastic material. As with the spring steel sheet 148, the spring steel sheet 160 can be provided in the form of a plurality (e.g., six to twelve) of thin steel sheets (see 160a, 160b as examples of two such spring steel sheets), each having a thickness of about 0.5-1.5 mm. In addition, the rear end of the spring steel sheet 160 has two enlarged holes 161 which allow the spring steel sheet 160 to be secured to the base member 146. These holes 161 permit different degrees of movement for each separate piece of steel sheet 160. More specifically, the significance of these holes 161 is that they allow for connection of the steering mechanism 16 to the frame 12 and base member 146 by means of nuts and bolts, while at the same time the individual steel sheets 160a, 160b, etc. are not locked together as the width of the holes 161 is larger than the diameter of a conventional bolt. This allows each spring steel sheet 160a, 160b to bend in different degrees. For example if one spring steel sheet 160b bends to the right, the spring steel sheet 160a to the right will bend less than the left most spring steel sheet 160. This improves the ease of turning and the degrees to which the steering mechanism 16 can turn.

FIGS. 4A-4C illustrate one benefit realized by the snow sled 10 of the present invention. The front ski 42, the ski support 40, the steering mechanism 16 and the Y-shaped arm 52 can all be folded for storage underneath the seating portion 18, thereby reducing the overall bulk and size of the sled 10 when the sled 10 is not in use. This makes it more convenient to store the sled 10, and to transport the sled (e.g., in a vehicle) to a desired sledding location. First, FIG. 4C illustrates the sled 10 in a normal use position with the front ski 42 fully extended to support the steering portion 20. To fold the front ski 42, the steering mechanism 16 is pivoted inwardly towards the rear, disengaging a first locking mechanism (not shown) that had been engaged to secure the front ski 42 in the normal use position. The front ski 42 is then slid inwardly in the direction of the underside of the seating portion 18 while the Y-shaped arm 52 is pivoted downwardly about a pivot axis defined by 60 (see FIG. 2), and the steering mechanism 16 continued to be pivoted about a pivot axis defined by 62 (see FIG. 2), such that the steering mechanism 16, the arm 52 and the ski support 40 are pivoted to be positioned underneath the seating portion 18 and the frame 12. During the pivoting motion, the front ski 42 can be pivoted about the arm 52 via the pivot joint 54. An optional second locking mechanism (not shown) can be engaged to secure the steering mechanism 16, the ski support 40 and the arm 52 underneath the frame 12. In the secured or storage position shown in FIG. 4A, the steering mechanism 16, the ski support 40, the arm 52 and the front ski 42 are all positioned underneath the periphery defined by the frame 12, so that the overall size of the sled 10 (when viewed from above) does not exceed the periphery of the frame 12.

To open the front ski 42 for use, the user starts from the storage position of FIG. 4A and pivots the steering mechanism 16 forwardly, disengaging the second locking mechanism (if used). As shown in FIG. 4B, the steering mechanism 16, the ski support 40, the arm 52 and the front ski 42 are all pivoted towards the front until the first locking mechanism is engaged in the normal use position (FIG. 4C).

Figure 5A:
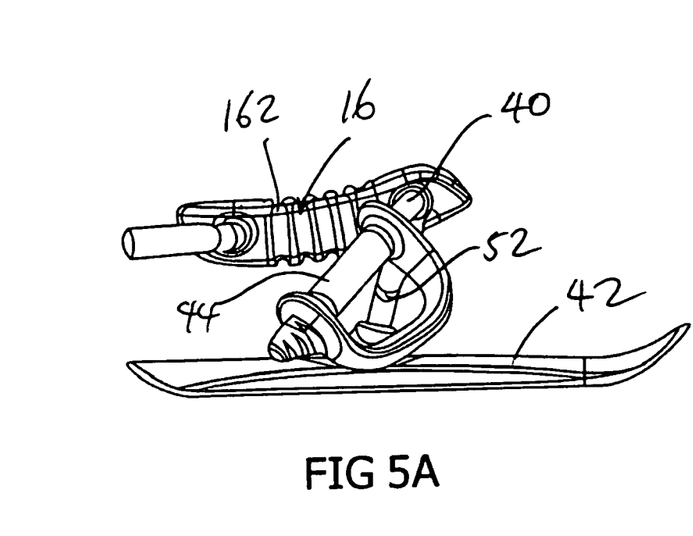
FIGS. 5A-5B illustrate the operation of the braking system.
Figure 5B:
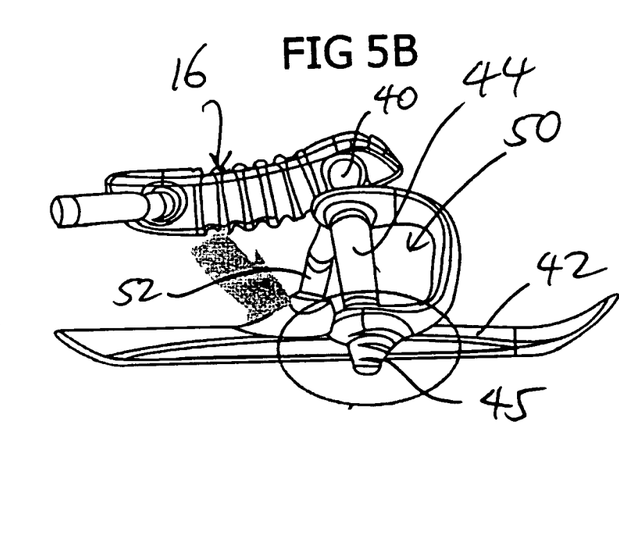

FIGS. 5A-5B illustrate another benefit realized by the snow sled 10 of the present invention. The construction of the ski support 40 and the Y-shaped arm 52 provide for an effective braking mechanism. FIG. 5A illustrates the positions of the ski support 40 and the Y-shaped arm 52 when the sled 10 is in normal use. To help the sled 10 brake (or slow down), the user merely grips the grips 44 and pushes the grips 44 forwardly, as shown in FIG. 5B. This action will cause the Y-shaped arm 52 to pivot forwardly, thereby lowering the grips 44 and causing the braking members 45 to contact the snow or ground, so as to create friction or resistance with respect to the snow on the ground.

Thus, the present invention provides a novel construction for a snow sled that provides an effective mechanism for folding the front ski 42, the ski support 40, the steering mechanism 16 and the Y-shaped arm 52 under the seating portion 18 for a more compact storage that occupies less space. This construction further provides an effective braking mechanism for the sled 10. In particular, the construction of the steering portion 20, with the design of the single front ski 42, the ski support 40 and the braking members 45, allow for the realization of these two benefits.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A snow sled that is used on snow, comprising:
   (i) a seating portion having a lower portion that is configured to slide on snow, and an upper portion that has a membrane for supporting a person, the seating portion including a frame that defines the upper and lower portions;
   (ii) a steering portion formed separately from the seating portion and having:
      a ski support having opposing ends, with a grip provided at each of the opposing ends;
      a single front ski; and
      an arm having a first end that is connected to the front ski at a first pivoting connection, and a second end that is connected to the ski support at a second pivoting connection;
   (iii) a steering mechanism having a first end that is connected to the ski support at a third pivoting connection, and a second end that is connected to the seating portion at a fourth pivoting connection; and
   wherein the first, second, third and fourth pivoting connections are configured to allow for the front ski to assume a first position where the front ski is fully extended, and to be folded to a second position where the front ski is stored under the seating portion.

2. The sled of claim 1, wherein the first pivoting connection is a pivot joint that couples the arm to the front ski.

3. The sled of claim 1, wherein the arm is Y-shaped, having two upper ends connected to the ski support, and a lower end connected to the front ski.

4. The sled of claim 1, further including braking members provided at each opposing end of the ski support.

5. The sled of claim 1, wherein the ski support includes at least one tubular member, with an elongated spring steel sheet retained in the at least one tubular member.

6. The sled of claim 5, wherein the elongated spring steel sheet includes a plurality of parallel spring steel sheets, each having a thickness between 0.5 mm and 1.5 mm.

7. The sled of claim 1, wherein the steering mechanism includes a plurality of parallel spring steel sheets that pivotably couple the seating portion and the ski support of the steering portion in a manner which provides rigidity and flexibility, with each spring steel sheet having a thickness between 0.5 mm and 1.5 mm.

8. A snow sled that is used on snow, comprising:
   (i) a seating portion having a lower portion that is configured to slide on snow, and an upper portion that has a membrane for supporting a person, the seating portion including a frame that defines the upper and lower portions;
   (ii) a steering portion formed separately from the seating portion and having:
      a ski support having opposing ends, with a grip provided at each of the opposing ends;
      a braking member provided at each end of the opposing ends of the ski support;
      at least one front ski; and
      an arm having a first end that is connected to the front ski at a first pivoting connection, and a second end that is connected to the ski support at a second pivoting connection;
   (iii) a steering mechanism having a first end that is connected to the ski support at a third pivoting connection, and a second end that is connected to the seating portion at a fourth pivoting connection; and
   wherein the first, second and third pivoting connections are configured to allow for the ski support to be pushed forwardly so that the grips are lowered and the braking members caused to contact the ground.

9. The sled of claim 8, wherein the first pivoting connection is a pivot joint that couples the arm to the at least one front ski.

10. The sled of claim 8, wherein the arm is Y-shaped, having two upper ends connected to the ski support, and a lower end connected to the at least one front ski.

11. The sled of claim 8, wherein the ski support includes at least one tubular member, with an elongated spring steel sheet retained in the at least one tubular member.

12. The sled of claim 11, wherein the elongated spring steel sheet includes a plurality of parallel spring steel sheets, each having a thickness between 0.5 mm and 1.5 mm.

13. The sled of claim 8, wherein the steering mechanism includes a plurality of parallel spring steel sheets that pivotably couple the seating portion and the ski support of the steering portion in a manner which provides rigidity and flexibility, with each spring steel sheet having a thickness between 0.5 mm and 1.5 mm.

\* \* \* \* \*